US008548477B2

(12) United States Patent
Hapsari et al.

(10) Patent No.: US 8,548,477 B2
(45) Date of Patent: Oct. 1, 2013

(54) MOBILE COMMUNICATION METHOD AND RADIO BASE STATION

(75) Inventors: Wuri Andarmawanti Hapsari, Yokosuka (JP); Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/866,165

(22) PCT Filed: Feb. 4, 2009

(86) PCT No.: PCT/JP2009/051877
§ 371 (c)(1),
(2), (4) Date: Oct. 1, 2010

(87) PCT Pub. No.: WO2009/099096
PCT Pub. Date: Aug. 13, 2009

(65) Prior Publication Data
US 2011/0021199 A1 Jan. 27, 2011

(30) Foreign Application Priority Data

Feb. 4, 2008 (JP) ................................ 2008-024616
Jan. 28, 2009 (JP) ................................ 2009-016681

(51) Int. Cl.
*H04W 36/00* (2009.01)
*H04W 4/00* (2009.01)
*H04B 7/00* (2006.01)

(52) U.S. Cl.
USPC ........... 455/440; 455/436; 455/442; 455/522; 370/331; 370/333

(58) Field of Classification Search
USPC ......................................................... 455/440
See application file for complete search history.

(56) References Cited

U.S. PATENT DOCUMENTS 6,259,923 B1 7/2001 Lim et al.
7,689,241 B2 * 3/2010 Usuda et al. .................. 455/522

(Continued)

FOREIGN PATENT DOCUMENTS

JP 2005-521350 A 7/2005
JP 2008-5074 A 1/2008

(Continued)

OTHER PUBLICATIONS

Japanese Office Action for Application No. 2009-016681, mailed on May 12, 2009 (4 pages).

(Continued)

*Primary Examiner* — Charles Appiah
*Assistant Examiner* — Natasha Cosme
(74) *Attorney, Agent, or Firm* — Osha Liang LLP

(57) ABSTRACT

A mobile communication method according to the present invention includes the steps: transmitting, from an exchange (MME) to a first radio base station (eNB), a location information reporting instruction which provides an instruction to report location information on a mobile station (UE); reporting, the first radio base station (eNB) to the exchange (MME), the location information on the mobile station (UE), in accordance with the location information reporting instruction; transmitting, the location information reporting instruction to a second radio base station (eNB), in a handover procedure of the mobile station (UE) from the first radio base station (eNB) to the second radio base station (eNB); and reporting, from the second radio base station (eNB) to the exchange (MME), the location information on the mobile station (UE), in accordance with the location information reporting instruction.

4 Claims, 9 Drawing Sheets

(56) References Cited

U.S. PATENT DOCUMENTS

| | | |
|---|---|---|
| 2005/0107094 A1 | 5/2005 | Hulkkonen et al. |
| 2006/0193272 A1 | 8/2006 | Chou et al. |
| 2010/0009652 A1 | 1/2010 | Hulkkonen et al. |
| 2011/0098048 A1* | 4/2011 | Zhang et al. .................. 455/438 |

FOREIGN PATENT DOCUMENTS

| | | |
|---|---|---|
| RU | 2296436 C2 | 3/2007 |
| WO | 9800988 A2 | 1/1998 |
| WO | 9847302 A2 | 10/1998 |
| WO | 2007008574 A2 | 1/2007 |

OTHER PUBLICATIONS

Japanese Office Action for Application No. 2009-016681, mailed on Jan. 5, 2010 (6 pages).

Extended European Search Report for Application No. 09709220.9, mailed on Feb. 14, 2011 (8 pages).

International Search Report w/translation from PCT/JP2009/051877 dated May 19, 2009 (3 pages).

Written Opinion from PCT/JP2009/051877 dated May 19, 2009 (3 pages).

Office Action for Korean Patent Application No. 10-2010-7018093 mailed Jun. 8, 2012, with English translation thereof (4 pages).

Office Action for Russian Application No. 2010134824/07 issued Nov. 11, 2011, with English translation thereof (10 pages).

Office Action for Mexican Application No. MX/a/2010/008529 dated Dec. 29, 2011, with English translation thereof (4 copies).

Office Action for Korean Application No. 2010-7018093 mailed Jan. 20, 2012, with English translation thereof (7 pages).

Office Action issued in Canadian Application No. 2,713,894 mailed Jan. 17, 2013, (3 pages).

* cited by examiner

FIG. 3

Location Information Control MESSAGE

| IE/Group Name | | Presence | General Description | Necessity for Emergency Call service in E-UTRAN |
|---|---|---|---|---|
| Message Type | | M | | |
| Request Type | Event | M | Indicate direct report, periodical report, report upon changes of service area | Necessary to set how the UE location need to be reported |
| | Report Area | | Rel.7.Service Area(cell level) on Geographical Area (LATITUDE/LONGITUDE),.... | Necessary to set the type pf cell information needed |

FIG. 4

Location Report MESSAGE

| IE/Group Name | Presence | General Description | Necessity for Emergency Call service in E-UTRAN |
|---|---|---|---|
| Message Type | M | | |
| Area Identity<br>> SAI<br>> Geographical Area<br>※either one | O | → (Rel.7)PLMN ID + LAC + SAC<br>→ Identify area using geographical coordinate | Necessary to inform MME about the cell ID |
| Request Type | O | Contains all the information set in Location Report Control | |

MOBILE COMMUNICATION METHOD AND RADIO BASE STATION

TECHNICAL FIELD

The present invention relates to a mobile communication method and a radio base station.

BACKGROUND ART

3GPP Working Group "SA1" defines a requirement for EPS (Evolved Packet System) to support Emergency Calls and Lawful Intercept.

Here, a "Location Reporting Procedure" used in a mobile communication system based on the UTRAN (Universal Terrestrial Radio Access Network) scheme is described with reference to FIG. 10.

As shown in FIG. 10, a core network apparatus CN is configured to transmit a "Location Reporting Control message" to a radio network controller RNC, the "Location Reporting Control message" providing an instruction to report location information on a mobile station UE performing a specific communication (for example, an emergency call or a communication targeted for lawful intercept).

Here, the radio network controller RNC is configured to report, upon receipt of the "Location Reporting Control message", any of the following pieces of information as the location information of the mobile station UE: location information (for example, geographical information in terms of longitude information and latitude information) on a radio base station NodeB establishing a radio communication link with the mobile station UE; and identification information of a cell under control of the radio base station NodeB establishing the radio communication link with the mobile station UE.

However, the "Location Reporting Procedure" in a mobile communication system based on the conventional UMTS scheme has the following problem. Specifically, when a mobile station UE performing a specific communication performs handover (RNC relocation) from one radio network controller RNC to another, a handover target radio network controller RNC cannot take over a content of the above described "Location Reporting Control message" received by a handover source radio network controller RNC. For this reason, the core network apparatus CN needs to retransmit the same "Location Reporting Control message" to the handover target radio network controller RNC after completion of a handover procedure for this mobile station UE.

DISCLOSURE OF THE INVENTION

Consequently, the present invention is made in consideration of the above described problem, and an object thereof is to provide a mobile communication method and a radio base station which enables a core network apparatus CN to acquire location information on a mobile station UE without retransmitting the same "Location Reporting Control message" after completion of a handover procedure for the mobile station UE.

A first aspect of the present invention is summarized as a mobile communication method including the steps: (A) transmitting, from a core network apparatus to a first radio base station, a location information reporting instruction which provides an instruction to report location information on a mobile station; (B) reporting, the first radio base station to the core network apparatus, the location information on the mobile station, in accordance with the location information reporting instruction; (C) transmitting, the location information reporting instruction to a second radio base station, in a handover procedure of the mobile station from the first radio base station to the second radio base station; and (D) reporting, from the second radio base station to the core network apparatus, the location information on the mobile station, in accordance with the location information reporting instruction.

In the first aspect, in the step (C), the first radio base station can transmit the location information reporting instruction to the second radio base station.

In the first aspect, in the step (C), the core network apparatus can transmit the location information reporting instruction to the second radio base station.

In the first aspect, the location information reporting instruction can provide an instruction to report, as the location information on the mobile station, location information on a radio base station establishing a radio communication link with the mobile station.

In the first aspect, the location information reporting instruction can provide an instruction to report, as the location information on the mobile station, location information on a cell being under control of a radio base station establishing a radio communication link with the mobile station.

In the first aspect, the location information reporting instruction can provide an instruction to report, as the location information on the mobile station, identification information on a cell being under control of a radio base station establishing a radio communication link with the mobile station.

In the first aspect, the location information reporting instruction can provide an instruction on how to report the location information on the mobile station.

A second aspect of the present invention is summarized as a radio base station including: a location information reporting instruction receiver unit configured to receive location information reporting instruction from a core network apparatus, the location information reporting instruction providing an instruction to report location information on a mobile station; a location information reporting unit configured to report, to the core network apparatus, the location information on the mobile station in accordance with the location information reporting instruction, when a radio communication link is established between the radio base station and the mobile station; and a location information reporting instruction transmitter unit configured to transmit, to a different radio base station, the location information reporting instruction, when the mobile station performs handover to the different radio base station.

In the second aspect, the location information reporting instruction can provide an instruction to report, as the location information on the mobile station, location information on a radio base station establishing a radio communication link with the mobile station.

In the second aspect, the location information reporting instruction can provide an instruction to report, as the location information on the mobile station, location information on a cell being under control of a radio base station establishing a radio communication link with the mobile station.

In the second aspect, the location information reporting instructions can provide an instruction to report, as the location information on the mobile station, identification information on a cell being under control of a radio base station establishing a radio communication link with the mobile station.

In the second aspect, the location information reporting instruction can provides an instruction on how to report the location information on the mobile station.

A third aspect of the present invention is summarized as a mobile communication method including the steps of: transmitting, from any one of a core network apparatus and another radio base station to a radio base station, a location information reporting instruction providing an instruction to report location information on a mobile station; reporting, from the radio base station to the core network apparatus, the location information on the mobile station, in accordance with the location information reporting instruction; and reporting, from the radio base station to the core network apparatus, the location information on the mobile station, in accordance with the location information reporting instruction, when the mobile station performs handover from a first cell to a second cell under control of the radio base station.

A fourth aspect of the present invention is summarized as a radio base station including: a location information reporting instruction receiver unit configured to receive a location information reporting instruction from any one of a core network apparatus and another radio base station, the location information reporting instruction providing an instruction to report location information on a mobile station; a location information reporting unit configured to report, to the core network apparatus, the location information on the mobile station in accordance with the location information reporting instruction, when a radio communication link is established between the radio base station and the mobile station; and a location information reporting unit configured to report, to the core network apparatus, the location information on the mobile station, when the mobile station performs handover from a first cell to a second cell under control of the radio base station.

BRIEF DESCRIPTION OF THE DRAWINGS

FIG. 3 is a diagram showing an example of a format of a "Location Reporting Control" message transmitted to the radio base station from an exchange according to the first embodiment of the present invention.

FIG. 4 is a diagram showing an example of a format of a "Location Report" message transmitted to the exchange from the radio base station according to the first embodiment of the present invention.

BEST MODE FOR CARRYING OUT THE INVENTION (Mobile Communication System According to First Embodiment of the Present Invention)

A mobile communication system according to a first embodiment of the present invention is described with reference to FIGS. 1 to 5.

Although a mobile communication system based on the LTE (Long Term Evolution) scheme is described as an example in this embodiment, the present invention is also applicable to other mobile communication systems.

Figure 1:
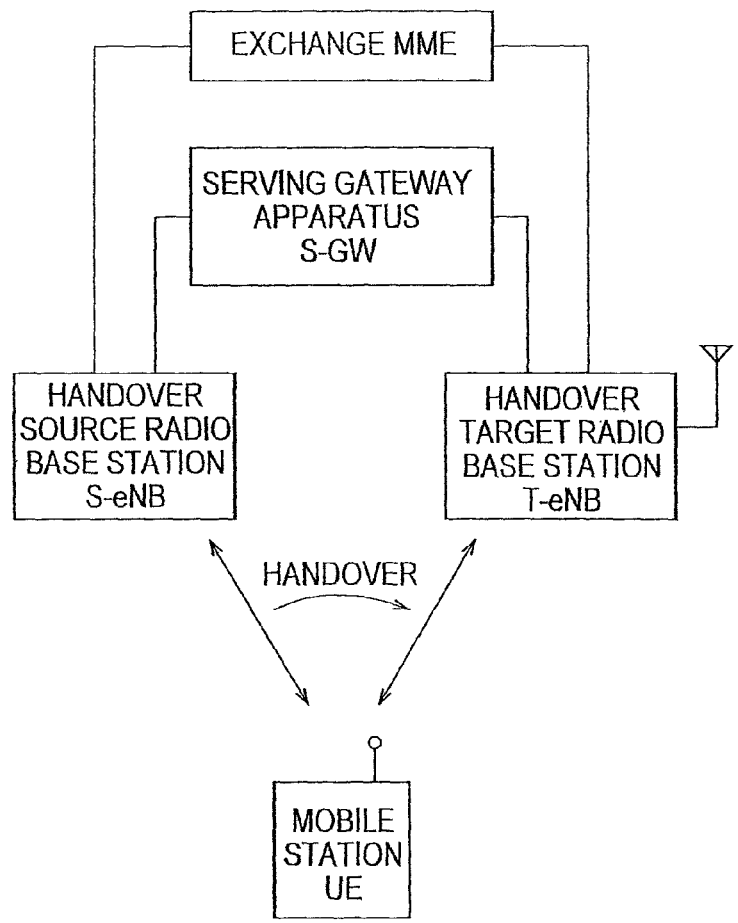
FIG. 1 is an entire configuration diagram of a mobile communication system according to a first embodiment of the present invention.

Specifically, as shown in FIG. 1, described in this embodiment is an example of a case where a mobile station UE performs handover (X2 handover) from a handover source radio base station S-eNB (Source eNB) to a handover target radio base station T-eNB (Target eNB) in the mobile communication system based on the LTE scheme.

Figure 2:
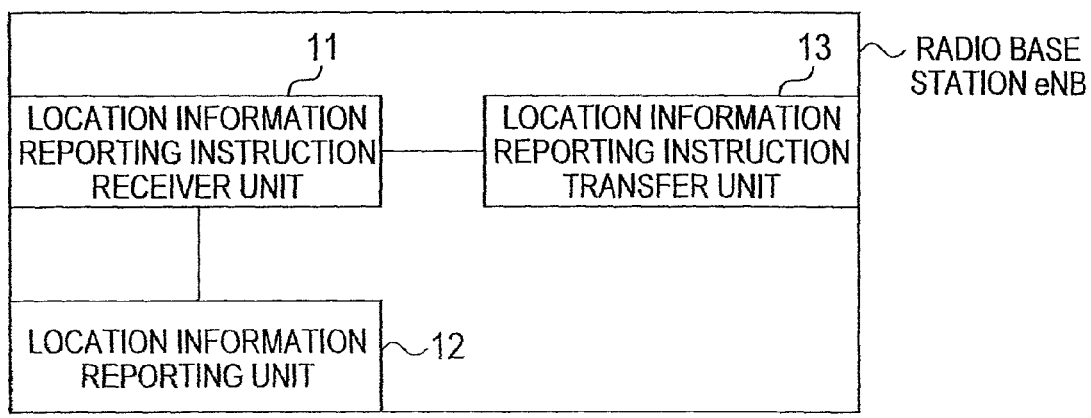
FIG. 2 is a functional block diagram of a radio base station according to the first embodiment of the present invention.

As shown in FIG. 2, a radio base station eNB according to this embodiment includes a location information reporting instruction receiver unit 11, a location information reporting unit 12 and a location information reporting instruction transfer unit 13.

The location information reporting instruction receiver unit 11 is configured to receive a "Location Reporting Control message (location information reporting instruction)" from a core network apparatus CN (an exchange MME in this embodiment) or another radio base station eNB. The "Location Reporting Control message" provides an instruction to report location information on a mobile station UE.

For example, the location information reporting instruction receiver unit 11 may be configured to receive a "Location Reporting Control message" from the core network apparatus CN (the MME in this embodiment) or another radio base station eNB, the "Location Reporting Control message" providing an instruction to report location information on a mobile station UE performing a specific communication (for example, an emergency call, a communication targeted for lawful intercept, or a communication on which a third party requests location information).

FIG. 3 shows an example of a format of a "Location Reporting Control" message.

As shown in "Report Area" in FIG. 3, the "Location Reporting Control" message may provide an instruction to report location information (for example, geographical information (Geographical Area) in terms of longitude information and latitude information) on a radio base station eNB as location information on a mobile station UE, the radio base station eNB establishing a radio communication link with the mobile station UE.

In addition, as shown in "Report Area" in FIG. 3, the "Location Reporting Control" message may provide an instruction to report location information (for example, geographical information (Geographical Area) in terms of longitude information and latitude information) on a cell as location information on a mobile station UE, the cell being under control of a radio base station eNB establishing a radio communication link with the mobile station UE.

Moreover, as shown in "Report Area" in FIG. 3, the "Location Reporting Control" message may provide an instruction to report identification information (for example, SAI: Service Area Identity (cell level)) on a cell as location information on a mobile station UE, the cell being under control of a radio base station eNB establishing a radio communication link with the mobile station UE.

Additionally, as shown in "Event" in FIG. 3, the "Location Reporting Control" message may provide an instruction on how to report location information on a mobile station UE.

For example, assumable methods of reporting the location information on the mobile station UE include: a method of reporting the location information on the mobile station UE every time the "Location Reporting Control message" is received; a method of reporting the location information on the mobile station UE on a regular basis; and a method of reporting the location information on the mobile station UE when a cell (a service area) with which the mobile station UE establishes a radio communication link is changed.

When a radio communication link is established between the radio base station eNB and a mobile station UE designated by a "Location Reporting Control message, the location information reporting unit 12 is configured to report location information on the mobile station UE to the core network apparatus CN (the exchange MME) in accordance with the "Location Reporting Control message".

For example, the location information reporting unit 12 may be configured to report the location information on the mobile station UE to the core network apparatus CN (the exchange MME) by using a "Location Report message" shown in FIG. 4.

As shown in FIG. 4, the "Location Report message" contains any of the following information as the location information of the mobile station UE: location information (for example, geographical information (Geographical Area) in terms of longitude information and latitude information) on a radio base station eNB establishing a radio communication link with the mobile station UE; location information (for example, geographical information (Geographical Area) in terms of longitude information and latitude information) on a cell under control of the radio base station eNB establishing a radio communication link with the mobile station UE; and identification information (for example, Service Area (cell level)) on the cell under control of the radio base station eNB establishing a radio communication link with the mobile station UE.

Note that the identification information on the cell (SAI) may be composed of a "PLMN (Public Land Mobile Network) ID", a "LAC (Location Area Code)" and a "SAC (Service Area Code)".

Additionally, instead of the "Location Report message", the location information reporting unit 12 may be configured to report the above described location information on the mobile station UE to the core network apparatus CN (the exchange MME) by using a "Path Switch Request" in an "X2 handover procedure".

When the mobile station UE performs handover (X2 handover) to another radio base station eNB (T-eNB) (more specifically, in an X2 handover procedure for the mobile station UE), the location information reporting instruction transfer unit 13 is configured to transmit the above described "Location Reporting Control message (location information reporting instruction)" to this other radio base station eNB (T-eNB).

For example, in this case, the location information reporting instruction transfer unit 13 of the handover source radio base station S-eNB is configured to transmit the "Location Reporting Control message" to the handover target radio base station T-eNB by inserting a content of the above described "Location Reporting Control message" into "4. Handover Request Message" of the "X2 handover procedure" shown in FIG. 5.

Figure 5:
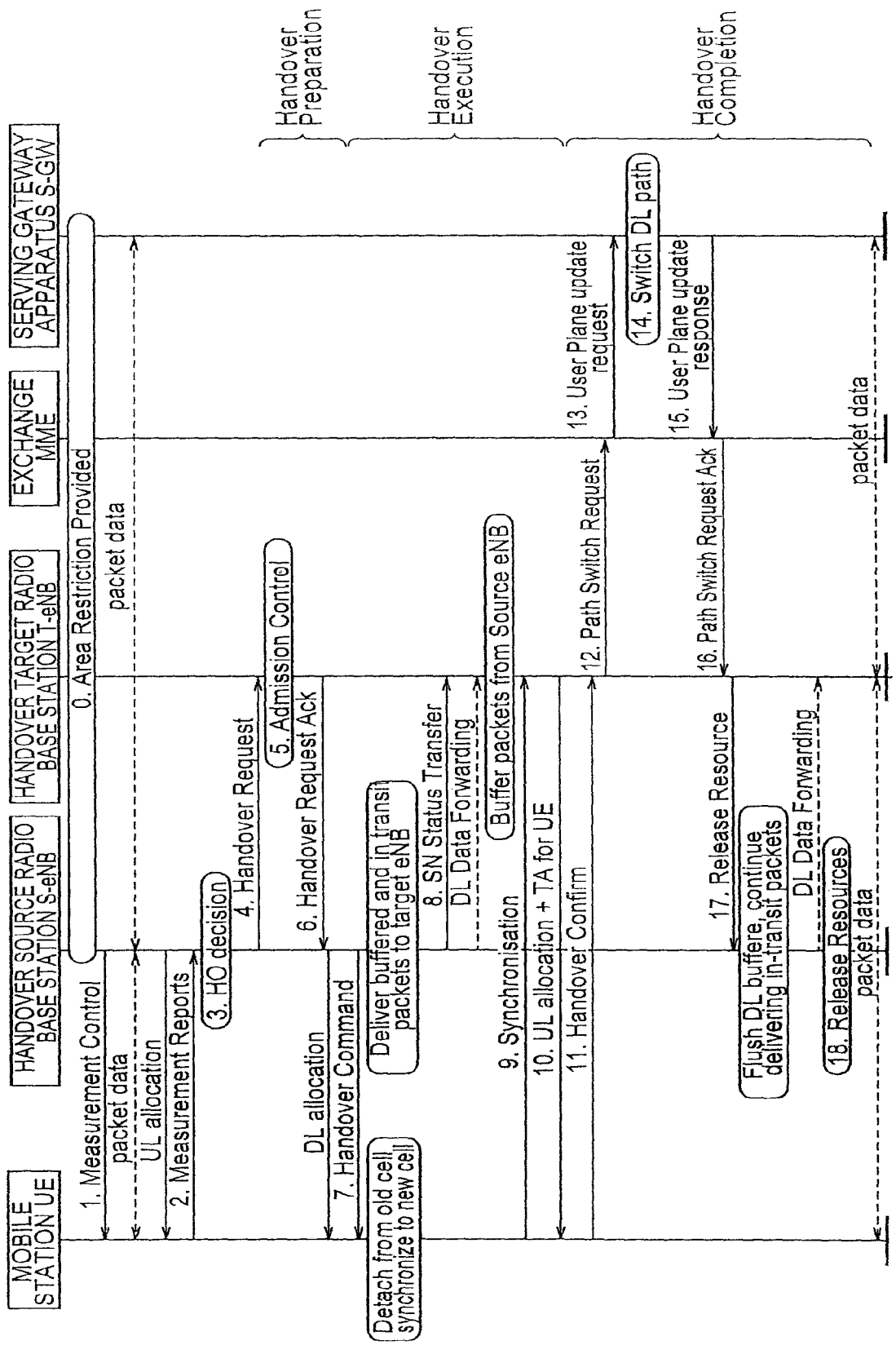
FIG. 5 is a sequence diagram illustrating an X2 handover procedure in the mobile communication system according to the first embodiment of the present invention.

Incidentally, as shown in FIG. 5, the handover source radio base station S-eNB is configured to transmit "4. Handover Request Message" to the handover target radio base station T-eNB, upon determining that the mobile station UE should perform handover (X2 handover) to the handover target radio base station T-eNB. The handover source radio base station S-eNB is configured to make this determination in accordance with "2. Measurement Reports" received from the mobile station UE.

Additionally, as shown in FIG. 5, the handover target radio base station T-eNB is configured to report the location information (for example, the above described identification information on a cell or the like) on the mobile station UE, by using "12. Path Switch Request", to the exchange MME.

According to the mobile communication system of this embodiment, the handover source radio base station S-eNB is configured to transmit a "Handover Request Message" containing a content of the above described "Location Reporting Control message" to the handover target radio base station T-eNB. Accordingly, when the mobile station UE performs X2 handover (more specifically, after completion of the X2 handover procedure for the mobile station UE), the exchange MME can acquire the location information on the mobile station UE without retransmitting the same "Location Reporting Control" message to the handover target radio base station T-eNB.

(Mobile Communication System According to Second Embodiment of the Present Invention)

A mobile communication system according to a second embodiment of the present invention is described with reference to FIGS. 6 and 7. The mobile communication system according to this embodiment is described below by focusing on differences from the above described first embodiment.

Figure 6:
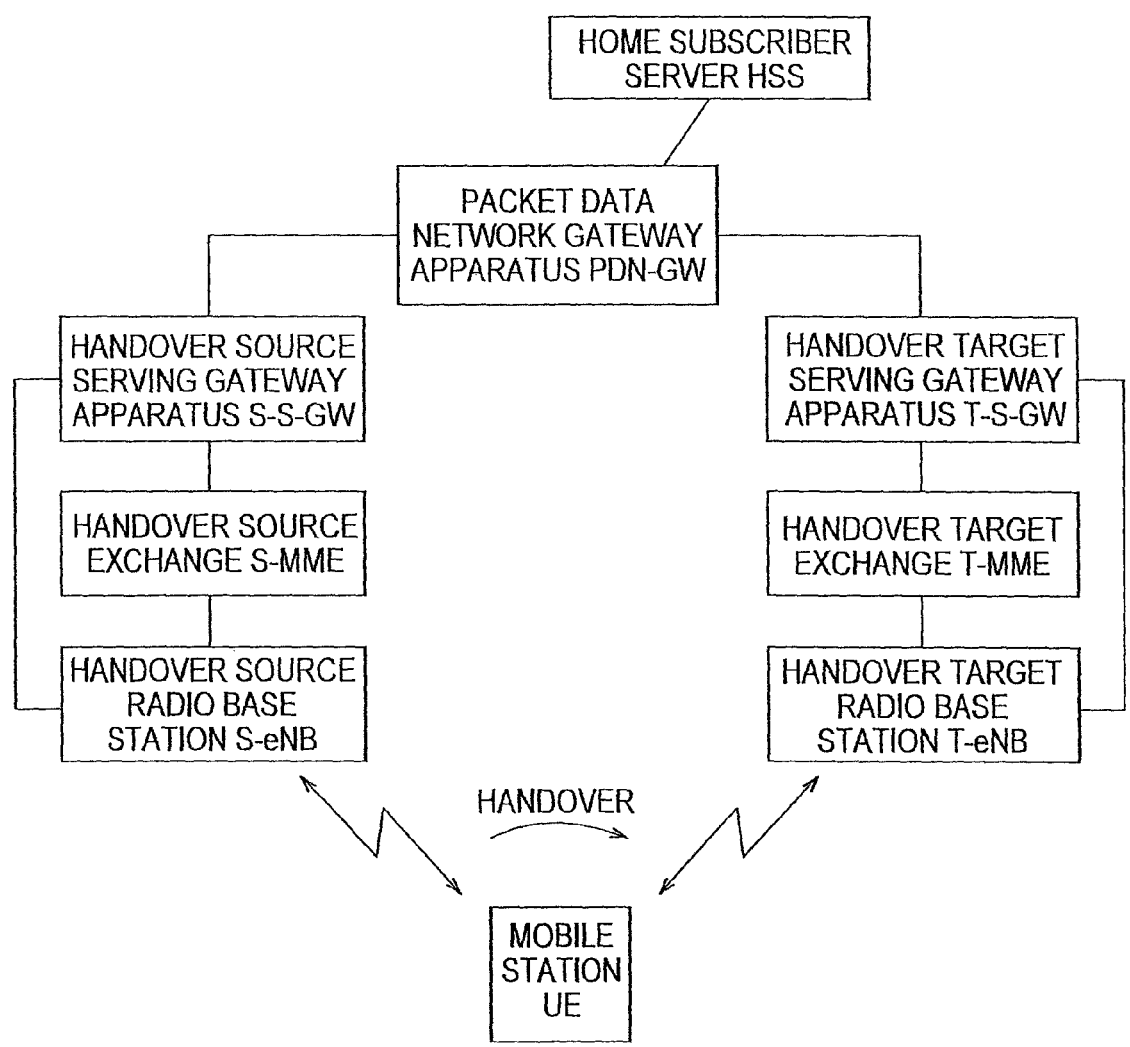
FIG. 6 is an entire configuration diagram of a mobile communication system according to a second embodiment of the present invention.

Specifically, as shown in FIG. 6, described in this embodiment is an example of a case where a mobile station UE performs handover (S1 handover) from a handover source radio base station S-eNB to a handover target radio base station T-eNB in a mobile communication system based on the LTE scheme. The handover source radio base station S-eNB is controlled by a handover source serving gateway apparatus S-S-GW (Source Serving Gateway) as well as a handover source exchange S-MME (Source MME), and the handover target radio base station T-eNB is controlled by a handover target serving gateway apparatus T-S-GW (Target Serving Gateway) as well as a handover target exchange T-MME (Target MME).

Here, the location information reporting instruction transfer unit 13 is configured to transmit the above described "Location Reporting Control message (location information reporting instruction)" to another radio base station (T-eNB), when the mobile station UE performs handover (S1 handover) to this other radio base station eNB (T-eNB) (more specifically, in an S1 handover procedure for the mobile station UE).

For example, in this case, the location information reporting instruction transfer unit 13 of the handover source radio base station S-eNB is configured to transmit the "Location Reporting Control message" to the handover target radio base station T-eNB, by inserting a content of the above described "Location Reporting Control message" into "2. Handover Required Message" of the "S1 handover procedure" shown in FIG. 7.

Note that the handover source radio base station S-eNB is configured to transmit "2. Handover Required Message" to a handover target radio base station T-eNB, upon determining that the mobile station UE should perform handover (S1 handover) to the handover target radio base station T-eNB.

The handover source radio base station S-eNB is configured to make this determination in accordance with "Measurement Reports" received from the mobile station UE.

Figure 7:
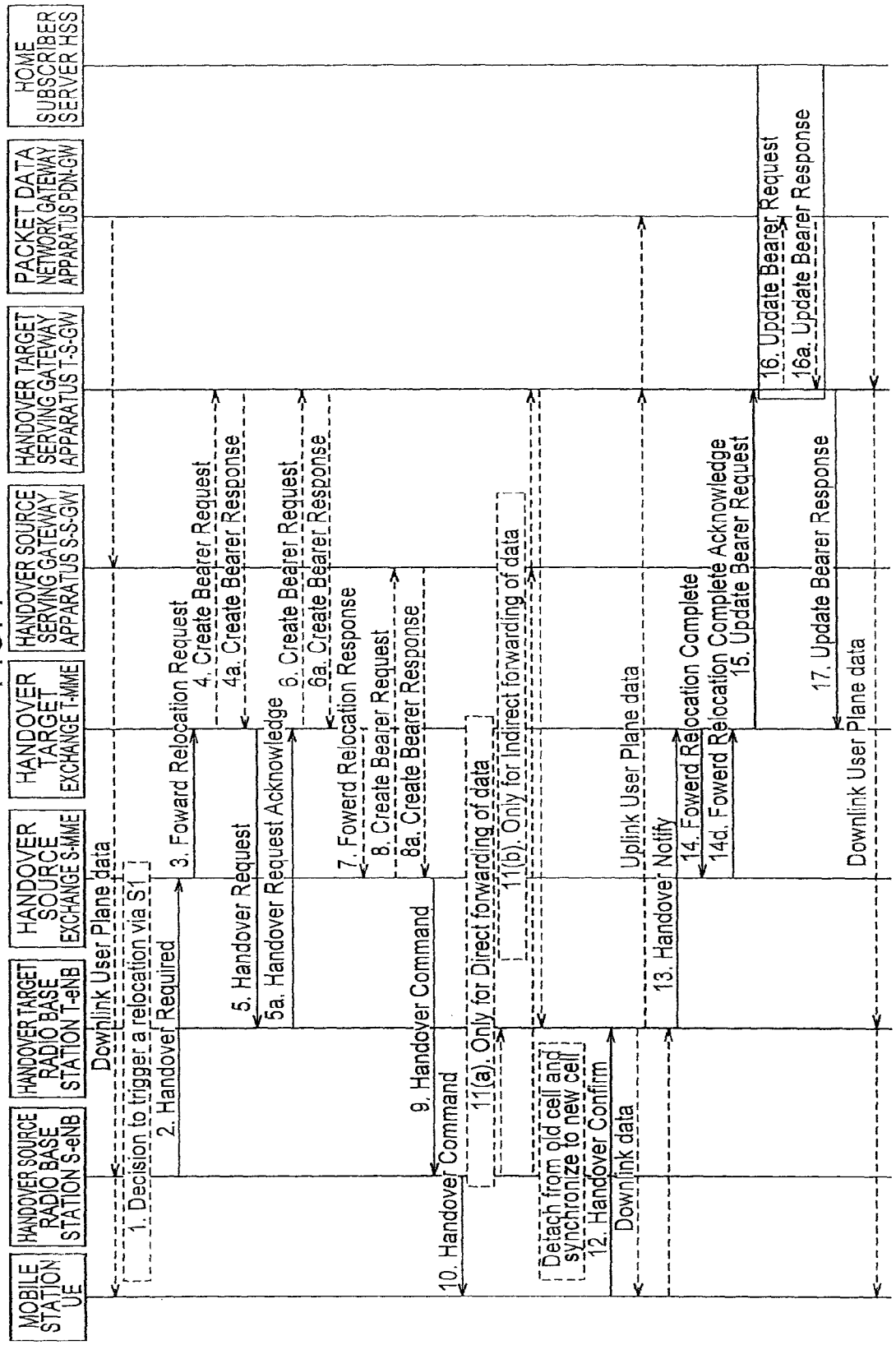
FIG. 7 is a sequence diagram illustrating an S1 handover procedure in the mobile communication system according to the second embodiment of the present invention.

Specifically, as shown in FIG. 7, the location information reporting instruction transfer unit 13 of the handover source radio base station S-eNB firstly transmits "2. Handover Required Message" containing the content of the above described "Location Reporting Control message" to the handover source exchange S-MME.

Secondly, upon receipt of "2. Handover Required Message," the handover source exchange S-MME transmits "3. Forward Relocation Request Message" containing the content of the above described "Location Reporting Control message" to the handover target exchange T-MME.

Thirdly, upon receipt of "3. Forward Relocation Request Message," the handover target exchange T-MME transmits "4. Create Bearer Request Massage" to the handover target serving gateway T-S-GW, and receives "4a. Create Bearer Response Message" from the handover target serving gateway T-S-GW. Thereafter, the handover target exchange T-MME transmits "5. Handover Request Message" containing the content of the above described "Location Reporting Control message" to the handover target radio base station T-eNB.

According to the mobile communication system of this embodiment, the handover source radio base station S-eNB is configured to notify, to the handover target radio base station T-eNB, the content of the above described "Location Reporting Control message", by transmitting a "Handover Required Message" containing the content of the above described "Location Reporting Control message". Accordingly, when the mobile station UE performs S1 handover (more specifically, after completion of the S1 handover procedure for the mobile station UE), the handover target exchange T-MME can acquire the location information on the mobile station UE without retransmitting the same "Location Reporting Control" message to the handover target radio base station T-eNB.

MODIFICATION EXAMPLE 1

In Modification Example 1 of the present invention, a core network apparatus CN (specifically, an exchange MME) is configured to transmit a "Location Reporting Control message (transmit location information reporting instruction)" to a second radio base station in a handover procedure for a mobile station UE from a first radio base station to the second radio base station, the mobile station UE performing a specific communication.

Specifically, in the "X2 handover procedure" shown in FIG. 5, the exchange MME is configured to transmit "16. Path Switch Request Ack Message" containing a content of the above described "Location Reporting Control message" to a handover target radio base station T-eNB.

According to this mobile communication system, the exchange MME is configured to notify, to the handover target radio base station T-eNB, the content of the above described "Location Reporting Control message", by transmitting a "Path Switch Request Ack Message" containing the content of the above described "Location Reporting Control message". Accordingly, when the mobile station UE performs X2 handover (more specifically, after completion of an X2 handover procedure for the mobile station UE), the exchange MME can acquire location information on the mobile station UE without retransmitting the same "Location Reporting Control" message to the handover target radio base station T-eNB.

MODIFICATION EXAMPLE 2

Figure 8:
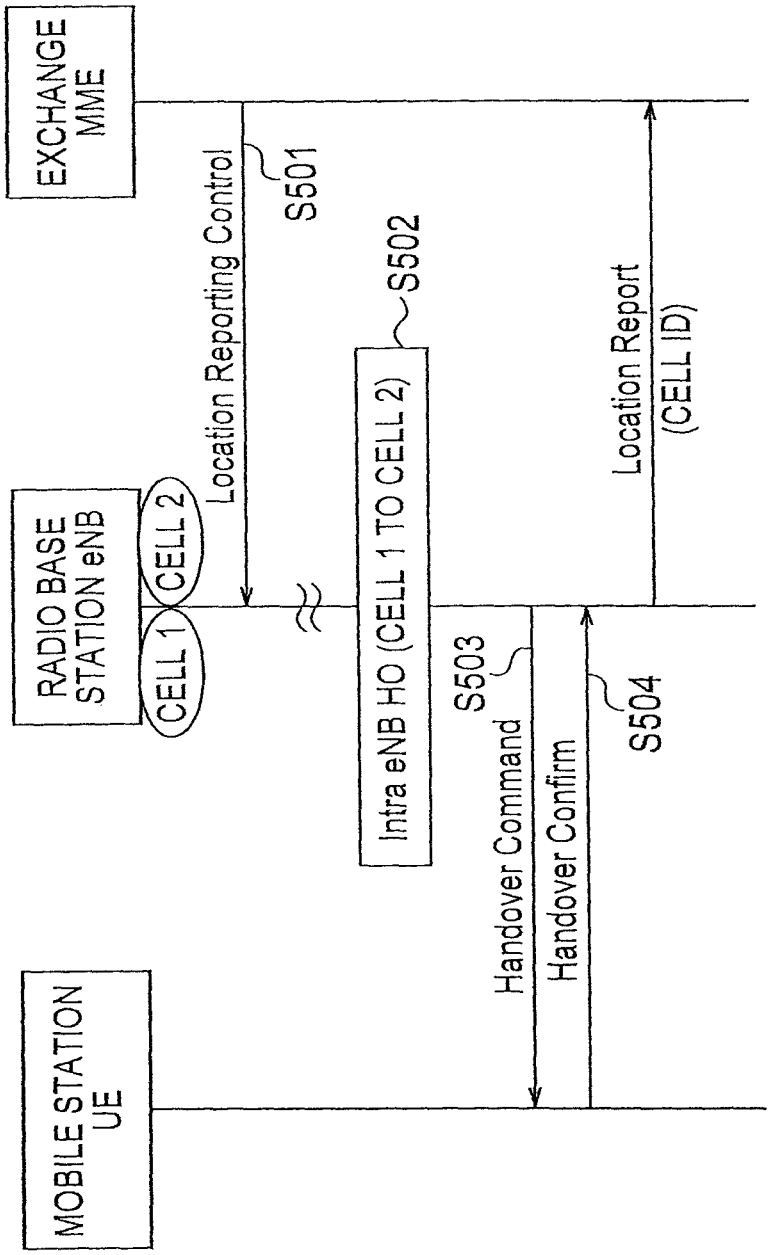
FIG. 8 is a sequence diagram illustrating an Intra-eNB handover procedure in a mobile communication system according to Modification Example 2 of the present invention.

Described below with reference to FIG. 8 is an example of a case where a mobile station UE performs handover (Intra-eNB handover) from a handover source cell (a cell 1) to a handover target cell (a cell 2) in a mobile communication system based on the LTE scheme according to Modification Example 2 of the present invention. The handover source cell is under control of a radio base station eNB, and the handover target cell is also under control of the same radio base station eNB.

As shown in FIG. 8, in step S501, an exchange MME transmits a "Location Reporting Control message" to the radio base station eNB with which the mobile station UE communicates, the "Location Reporting message" providing an instruction to report location information on the mobile station UE.

In step S502, carried out is a handover procedure (an Intra-eNB handover procedure) for the mobile station UE from the cell 1 to the cell 2, both of which are under control of the radio base station eNB.

The radio base station eNB transmits a "Handover Command message" to the mobile station UE in step S503, and the mobile station UE transmits a "Handover Confirm message" to a radio base station eNB in step S504.

In step S505, the radio base station eNB transmits a "Location Report message" to the exchange MME, the "Location Report message" used for notifying the exchange MME of the location information (for example, identification information on a cell) on the mobile station UE.

MODIFICATION EXAMPLE 3

Figure 9:
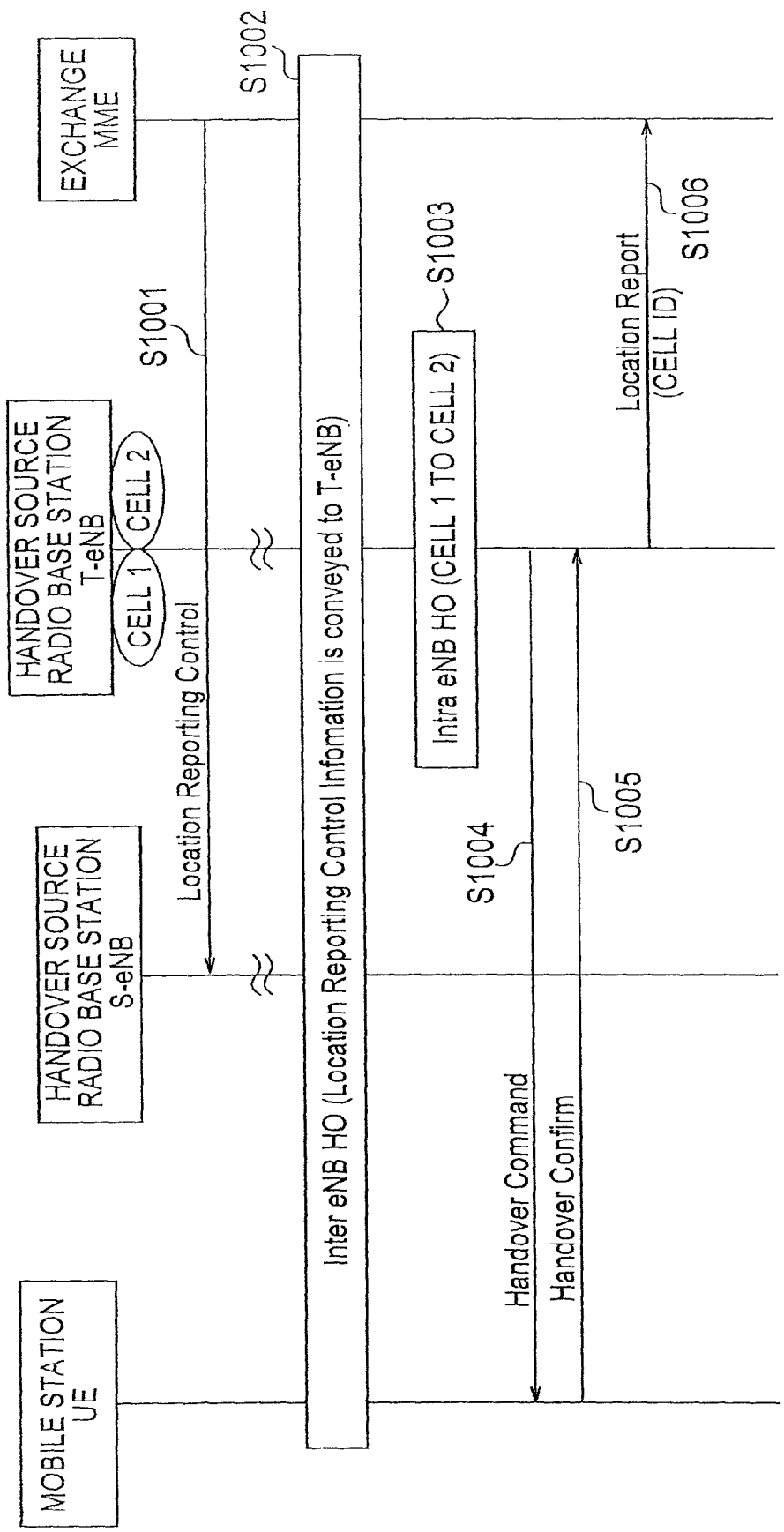
FIG. 9 is a sequence diagram illustrating an Intra-eNB handover procedure in a mobile communication system according to Modification Example 3 of the present invention.
Figure 10:
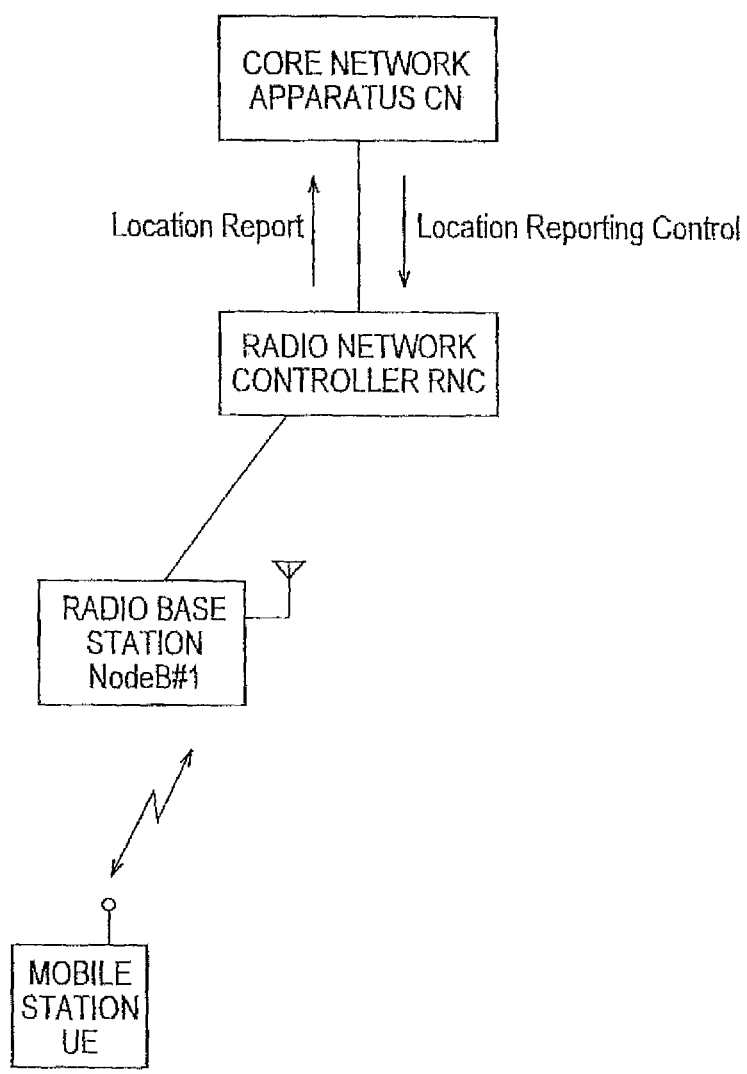
FIG. 10 is a diagram provided for explaining a problem in a conventional mobile communication system.

Described below with reference to FIG. 9 is an example of a case where a mobile station UE performs handover (Intra-eNB handover) from a handover source cell (a cell 1) to a handover target cell (a cell 2) in an mobile communication system based on the LTE scheme according to Modification Example 3 of the present invention. The handover source cell is under control of a radio base station eNB, and the handover target cell is also under control of the same radio base station eNB.

As shown in FIG. 9, in step S1001, the exchange MME transmits a "Location Reporting Control message" to a handover source radio base station S-eNB with which a mobile station UE communicates, the "Location Reporting Control message" providing an instruction to report location information on the mobile station UE.

In response, the handover source radio base station S-eNB reports the location information on the mobile station UE to the exchange MME at a predetermined timing.

Thereafter, in step S1002, carried out is a handover procedure (the Inter-eNB handover procedure or the X2 handover procedure) for the mobile station UE from a cell under control of the handover source radio base station S-eNB to the cell 1 under control of a handover target radio base station T-eNB.

Here, the handover source radio base station S-eNB notifies the handover target radio base station T-eNB of the "Location Reporting Control message."

In step S1003, carried out is a handover procedure (the Intra-eNB handover procedure) from the cell 1 to the cell 2, both of which are under control of the handover target radio base station T-eNB.

The handover target radio base station T-eNB transmits a "Handover Command message" to the mobile station UE in step S1004, and the mobile station UE transmits a "Handover Confirm message" to the radio base station T-eNB in step S1005.

In step S1006, the handover target radio base station T-eNB transmits a "Location Report message" or a "Path Switch Request message" to the exchange MME, the "Location Report message" and "Path Switch Request message" used for notification of the location information (for example, identification information on a cell) on the mobile station UE.

Note that operation of the above described mobile station UE, the radio base station eNB, the exchange MME and the serving gateway apparatus S-GW may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station eNB, the exchange MME and the serving gateway apparatus S-GW. Also, the storage medium and the processor may be provided in the mobile station UE, the radio base station eNB, the exchange MME and the serving gateway apparatus S-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

Industrial Applicability

As described above, the present invention provides a mobile communication method and a radio base station which enable a core network apparatus CN to acquire location information on a mobile station UE without retransmitting the same "Location Reporting Control" message after completion of a handover procedure for the mobile station UE.

The invention claimed is:

1. A mobile communication method comprising the steps of:
    (A) transmitting, from any one of a core network apparatus and another radio base station to a radio base station, a location information reporting instruction providing an instruction to report location information on a mobile station; and
    (B) reporting, from the radio base station to the core network apparatus, the location information on the mobile station, when the radio base station has received the location information reporting instruction, and when the mobile station has performed a handover from a first cell to a second cell, both of which are under control of the same radio base station, thereby enabling the core network apparatus to acquire the location information on the mobile station without retransmitting a same Location Reporting Control message after completion of the handover for the mobile station.

2. The mobile communication method according to claim 1, wherein in the step (B), the location information on the mobile station is reported to the core network apparatus, by using a "Location Report message".

3. A radio base station comprising:
    a location information reporting instruction receiver unit configured to receive a location information reporting instruction from any one of a core network apparatus and another radio base station, the location information reporting instruction providing an instruction to report location information on a mobile station; and
    a location information reporting unit configured to report, to the core network apparatus, the location information on the mobile station, when the location information reporting instruction is received by the location information reporting instruction receiver unit, when the mobile station has performed a handover from a first cell to a second cell, both of which are under control of the same radio base station, and when a radio communication link is established between the radio base station and the mobile station, thereby enabling the core network apparatus to acquire the location information on the mobile station without retransmitting a same Location Reporting Control message after completion of the handover for the mobile station.

4. The radio base station according to claim 1, wherein the location information reporting unit is configured to report, to the core network apparatus, the location information on the mobile station, by using a "Location Report message".

* * * * *